(No Model.)
T. O'BRIEN.
BICYCLE.
No. 388,906. Patented Sept. 4, 1888.
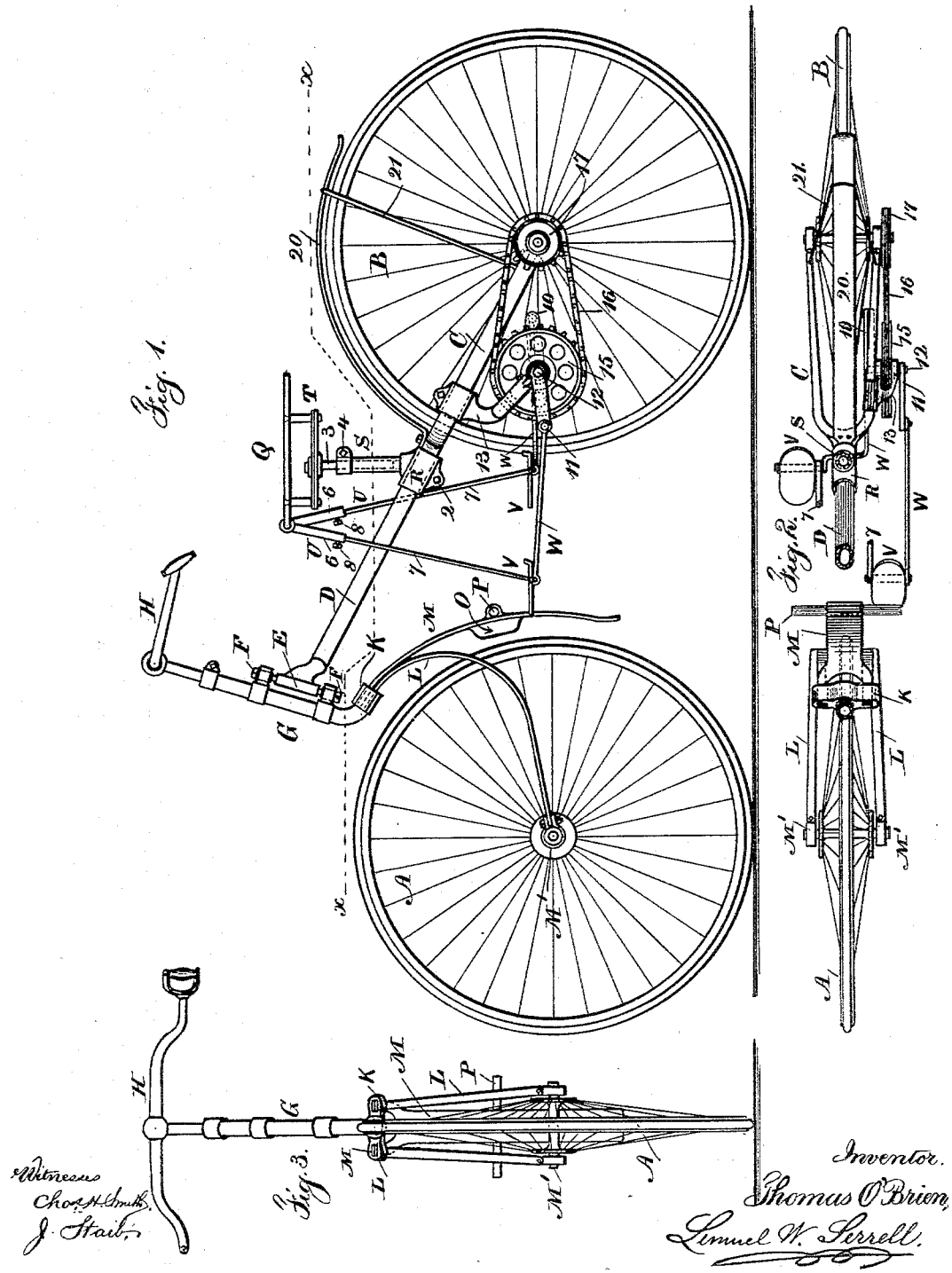
Witnesses
Chas H Smith
J. Staib
Inventor
Thomas O'Brien
Lemuel W. Serrell

UNITED STATES PATENT OFFICE.

THOMAS O'BRIEN, OF NEW YORK, N. Y.

BICYCLE.

SPECIFICATION forming part of Letters Patent No. 388,906, dated September 4, 1888.

Application filed October 21, 1887. Serial No. 252,989. (No model.)

*To all whom it may concern:*

Be it known that I, THOMAS O'BRIEN, of the city and State of New York, have invented an Improvement in Bicycles, of which the following is a specification.

The object of this invention is to simplify the construction of the frame-work connecting the wheels and to render the fork of the steering-wheel a spring and to drive the bicycle by a swinging movement of the legs instead of a downward pressure.

In the drawings, Figure 1 is an elevation of the bicycle. Fig. 2 is a sectional plan below the line $x\ x$, and Fig. 3 is an elevation of the steering-wheel and handle.

The steering-wheel A and driving-wheel B are of ordinary construction, and the fork C has at its lower ends the bearings for the shaft of the driving-wheel B, and such fork extends forwardly and upwardly and is united to the tubular spine D, and at the forward end of this spine D is the pivot-neck E, connected by the screws F to the steering-rod G, having the handle-bars H at the upper end. The lower end of the steering-rod G is curved backwardly and formed with a T-head clip, K, having mortises through it, into which are received the ends of the curved springs L M. The springs L are curved downwardly and forwardly and receive at their lower front ends the bearings M' for the axle of the steering-wheel A, and the spring M forms a combined mud-guard and brake, such spring M having upon its front surface the brake-block O, that is adjacent to the steering-wheel, and there are cross foot-pieces P behind the brake-block, so that the rider when seated upon the seat Q can press the brake O against the periphery of the wheel A by one or both feet acting upon the foot-piece P. During this operation the spring mud-guard M yields, and when the pressure is removed the said spring mud-guard removes the brake from the wheel. The springs L yield as the wheel A passes over any obstruction or inequality, thereby rendering the bicycle easy to ride.

The seat Q is upon a vertical standard, S, having at its lower end the tubular clip R around the spine D, and this clip can be loosened and adjusted forwardly or backwardly upon the spine and then firmly clamped by tightening the bolt 2. The standard S is tubular, and within it is the rod 3, that can be raised or lowered and then clamped by tightening the bolt 4, and the spring T is connected in the middle to the top of the rod 3 and at its ends to the seat Q, so that the seat will spring or yield to the weight of the person.

The pendent links U are pivoted at their upper ends to the seat Q, and they are adjustable in length, each being formed of two parts, 6 7, the rod 7 sliding within the tube 6 and being clamped by the screw 8.

At the lower ends of the links U are the treadles or foot-piece V, that are attached to the horizontal links W, which at their rear ends are made with eyes receiving the pins of the cranks 10 and 11. These cranks are upon a shaft, 12, supported by a fork, 13, below the fork C, at one side thereof, and between the fork 13 is the chain-wheel 15, and there is an endless chain, 16, to the chain-wheel 17 upon the shaft of the driving-wheel B. It is to be observed that the chains and chain-wheels are at one side of the machine, and that one of the connecting-rods W is bent so as to pass across the front edge of the driving-wheel, as seen in Fig. 2. The rider while seated upon the seat Q propels the machine by the swinging movement of the feet as they act upon the treadles V. The cranks 10 and 11 may be at right-angles, but I prefer to place them opposite to each other, as shown, and the cross-piece P for the brake being near to the treadles V, the rider can slip one or both feet out of the treadles in applying the brake.

The mud guard 20 over the wheel B is supported by the braces 21 from the fork C.

I claim as my invention—

1. The combination, with the steering-wheel and steering-bar in a bicycle, of the springs L, extending from the steering-rod G to the axle of the steering-wheel, the spring mud-guard M, and the brake O upon the same, substantially as set forth.

2. The combination, with the steering-wheel A, driving-wheel B, spine D, and fork E, of the chain-wheels 15 and 17, endless chain 16, the fork 13, connected to the fork C at one side of the driving-wheel and sustaining the chain-wheel 15, the cranks 10 and 11, the connecting-rods W, treadles V, hanging links U, and the seat Q, to which the hanging links are pivoted at their upper ends, and the standard S, supporting the seat, substantially as set forth.

3. The combination, in a bicycle, of the wheels A B, the fork C, spine D, steering-bar pivoted to the spine, the spring mud-guard M, the brake O, and cross-piece P upon the same, the seat Q, the hanging links U, pivoted to the seat at their upper ends, the treadles, connecting-rod, crank, chain-wheels, and chain, substantially as set forth.

Signed by me this 20th day of October, A. D. 1887.

THOMAS O'BRIEN.

Witnesses:
   GEO. T. PINCKNEY,
   WILLIAM G. MOTT.